(12) United States Patent
Crosby et al.

(10) Patent No.: US 9,525,698 B2
(45) Date of Patent: Dec. 20, 2016

(54) RISK PRIORITIZATION AND MANAGEMENT

(71) Applicants: Keesha M. Crosby, Manassas, VA (US); Robin A. Gandhi, Omaha, NE (US); Harvey Siy, Omaha, NE (US)

(72) Inventors: Keesha M. Crosby, Manassas, VA (US); Robin A. Gandhi, Omaha, NE (US); Harvey Siy, Omaha, NE (US)

(*) Notice: Subject to any disclaimer, the term of this patent is extended or adjusted under 35 U.S.C. 154(b) by 0 days.

(21) Appl. No.: 14/269,236

(22) Filed: May 5, 2014

(65) Prior Publication Data

US 2014/0337982 A1   Nov. 13, 2014

Related U.S. Application Data

(60) Provisional application No. 61/821,369, filed on May 9, 2013.

(51) Int. Cl.
*G06F 21/00* (2013.01)
*H04L 29/06* (2006.01)

(52) U.S. Cl.
CPC ................... *H04L 63/1433* (2013.01)

(58) Field of Classification Search
USPC .................................................. 713/189–194
See application file for complete search history.

(56) References Cited

U.S. PATENT DOCUMENTS

| 8,789,192 B2 * | 7/2014 | LaBumbard | 726/25 |
| 2011/0179477 A1 * | 7/2011 | Starnes et al. | 726/9 |

* cited by examiner

*Primary Examiner* — Ghazal Shehni
(74) *Attorney, Agent, or Firm* — Cahn & Samuels, LLP

(57) ABSTRACT

Methods for managing and prioritizing risk include receiving a data set and analyzing the data set for duplicates, false positives, false negatives, and tool errors. Said duplicates, false positives, false negatives and results of tool errors are removed from the data set, creating an input file. The input file is compared against compliance standards to identify any weaknesses, defects, bugs, flaws, vulnerabilities, and/or failures in the input file. The compared input file is mapped to Common Weakness Enumeration standards. A risk prioritization can be generated based on the mapped results. At least one report can be generated based on the risk prioritization.

14 Claims, 3 Drawing Sheets

US 9,525,698 B2

RISK PRIORITIZATION AND MANAGEMENT

PRIORITY CLAIM

This application claims priority to U.S. provisional application No. 61/821,369, filed on May 2013, the entire disclosure of which is incorporated herein by reference in its entirety.

FIELD OF THE INVENTION

The present invention relates to method and systems for prioritizing and managing risk for various types of data within a variety of settings.

BACKGROUND

An enormous amount of information is exchanged, shared, generated, created and/or maintained on a regular basis by individuals, schools, businesses, corporations, governments, regions, countries, and the like. However, managing and engaging with said information, including data, applications, programs, and associated networks, systems, and applications is not without risk, vulnerabilities, failures, weaknesses, defects, bugs, flaws, and/or threats.

Whether the risk is in the form of a computer virus, or in the form of a weakness in the application, program and/or system whereby an unauthorized user can obtain access to proprietary information, what is needed are methods and systems related to software assurance, such as with regard to prioritizing and managing risk for various types of data in a variety of settings.

Moreover, although several compliance standards and/or industry standards associated with compliance, risk and software assurance exist, there remains a need for methods and systems to process data, prioritize risks, map said standards to Common Weakness Enumeration Standards, and generate reports to systematically manage, mitigate, and address weaknesses, defects, bugs, flaws, vulnerabilities, and/or failures in a variety of settings.

More specifically, there exists a need for methods and systems capable of receiving and analyzing sets of data, comparing the data to compliance standards to identify weaknesses, defects, bugs, flaws, vulnerabilities, and/or failures, and further map such findings to Common Weakness Enumeration standards, such as MITRE® Common Weakness Enumeration standards. The present disclosure addresses these and other needs by providing methods and systems for managing and prioritizing risk, as described herein.

SUMMARY

A method for managing and prioritizing risk is described herein, the method including receiving a data set. The data set is analyzed for the presence of duplicates. Analyzing of the data set also includes evaluating the results for false positives, false negatives, and tool errors. Duplicates are removed from the data set, thereby creating an input file. The input file is compared against a library of compliance standards to identify a presence of weaknesses, defects, bugs, flaws, vulnerabilities, and/or failures in the input file. The compared input file is then mapped to Common Weakness Enumeration standards. A risk prioritization is created based on the mapped results, and a report is generated based on the risk prioritization.

Another method for managing and prioritizing risk is described herein, the method including receiving a data set. The data set is analyzed for the presence of duplicates. Analyzing of the data set also includes evaluating the results for false positives, false negatives, and tool errors. Duplicates are removed from the data set, thereby creating an input file. A rules engine is applied to the input file to identify a presence of weaknesses, defects, bugs, flaws, vulnerabilities, and/or failures in the input file. The compared input file is then mapped to Common Weakness Enumeration standards. The mapped weaknesses, defects, bugs, flaws, vulnerabilities, and/or failures are prioritized. A report is generated based on the prioritization.

DETAILED DESCRIPTION

Figure 1:
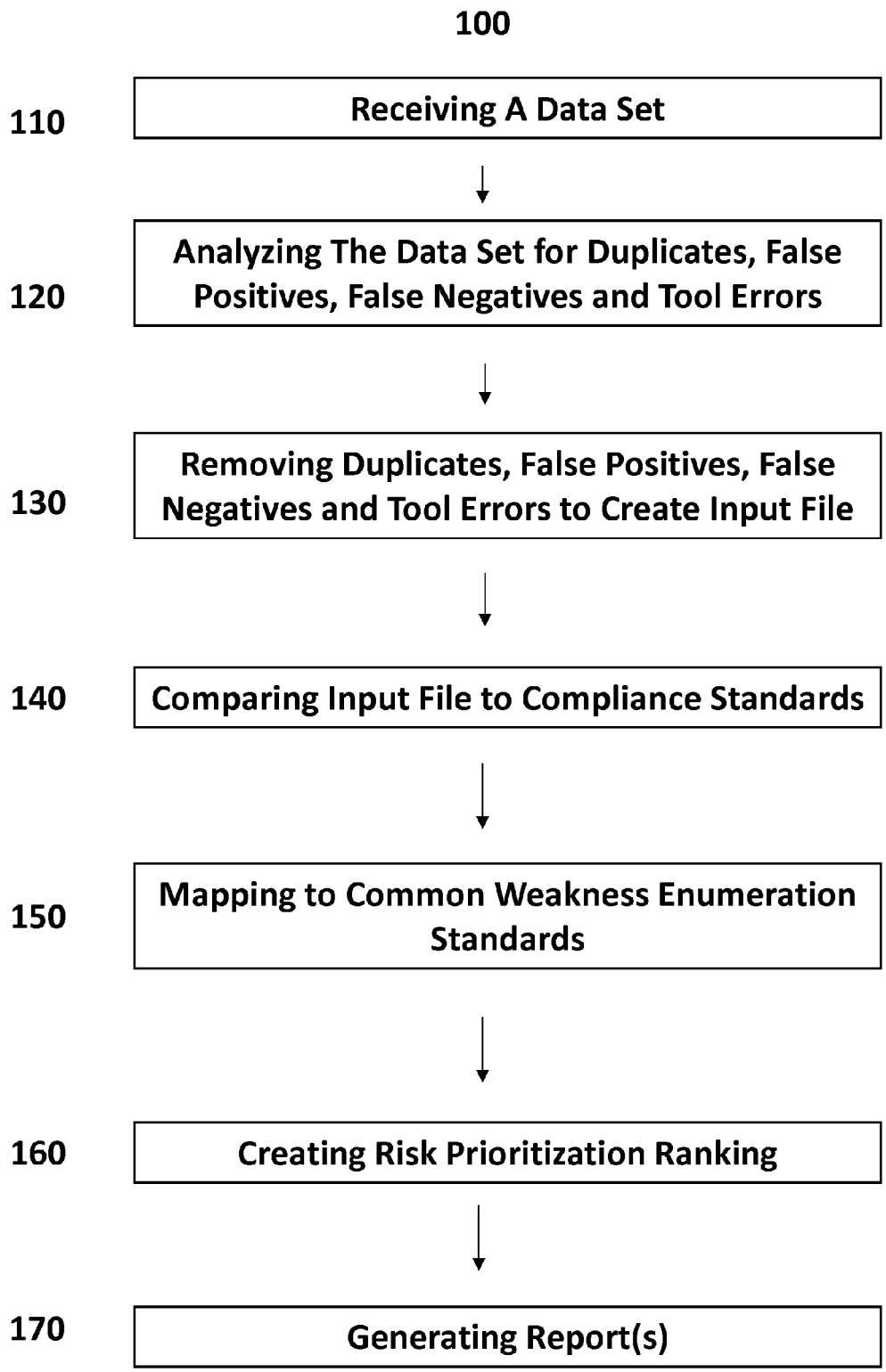
FIG. 1 illustrates a flow chart for a method for managing and prioritizing risk according to one embodiment of the present invention.

As used herein "substantially", "relatively", "generally", "about", and "approximately" are relative modifiers intended to indicate permissible variation from the characteristic so modified. They are not intended to be limited to the absolute value or characteristic which it modifies but rather approaching or approximating such a physical or functional characteristic.

In the detailed description, references to "one embodiment", "an embodiment", or "in embodiments" mean that the feature being referred to is included in at least one embodiment of the invention. Moreover, separate references to "one embodiment", "an embodiment", or "in embodiments" do not necessarily refer to the same embodiment; however, neither are such embodiments mutually exclusive, unless so stated, and except as will be readily apparent to those skilled in the art. Thus, the invention can include any variety of combinations and/or integrations of the embodiments described herein.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of at least one other feature, integer, step, operation, element, component, and/or groups thereof.

It will be appreciated that as used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus.

It will also be appreciated that as used herein, and unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

It will also be appreciated that as used herein, any reference to a range of values is intended to encompass every value within that range, including the endpoints of said ranges, unless expressly stated to the contrary.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute with the processor of the computer or other programmable data processing apparatus, create means for implementing the functions/acts specified in the flowchart and/or block diagram block or blocks.

These computer program instructions may also be stored in a computer readable medium that can direct a computer, an operating system, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, a processor, other programmable data processing apparatus, or other devices to cause a series of operational steps to be performed on the computer, the processor, or other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Software assurance can be considered the application of technologies and processes to achieve a required and desired level of confidence, that software systems and services function in the intended manner, are free from accidental or intentional vulnerabilities, provide security capabilities appropriate for the threat environment, and recover from intrusions and/or failures.

The measure of confidence that the security functionality is implemented correctly, operating as intended, and producing the desired outcome with respect to, for example, meeting the security requirements of the system, user, and/or organization is one important aspect of software assurance.

From an information security perspective and software perspective, trust can be considered a belief that a security-relevant entity will behave in a predictable manner when satisfying a defined set of security requirements under specified conditions/circumstances, and all while subject to disruptions, human errors, component faults and/or failures, and purposeful attacks that may occur in the operation environment.

Accordingly embodiments of the present disclosure provide innovative and superior advanced methods and systems in the field of software assurance for identifying, managing and prioritizing risk by, inter alia, comparing input files to any one of a number of compliance standards, and mapping said compared input files to Common Weakness Enumeration standards. It will be appreciated by one of ordinary skill in the art that methods and systems of the present invention provide innovative and superior methods and systems for identifying, managing and prioritizing weaknesses, defects, bugs, flaws, vulnerabilities, and/or failures in data files to provide a level of software assurance and software remediation previously unavailable in the art.

Moreover, embodiments of the present disclosure provide innovative methods and systems associated with risk allocation, risk prioritization, and/or risk mitigation strategies across a variety of settings and projects of varying scope. As described below, embodiments of the present disclosure provide innovative methods and systems for allocating, prioritizing, and/or mitigating risk across, for example, a software project that has "x" number of planned upgrades, iterations, versions, and/or stages, etc.

With reference to FIG. 1, a flowchart depicting a method for managing and prioritizing risk 100 according to one embodiment of the present disclosure is illustrated therein.

The method 100 can include a step of receiving a data set 110. The data set can be received from at least one and up to both of a static code analysis tool and/or a dynamic analysis tool, including multiple static code analysis tools and multiple dynamic analysis tools. For instance, the data set can be received from at least one SCA/DCA (static code analysis/dynamic code analysis) tool(s); from a plurality of SCA/DCA tools; from a plurality of static code analysis tools; from a plurality of dynamic code analysis tools; from one static code analysis tool; from one dynamic code analysis tool; from three static code analysis tools, etc.

In embodiments, the data set can include any one of software, software code and software applications. In certain embodiments, the data set can include lengthy, complex, robust, and significantly detailed software code and software code applications with high levels of complexity, functions, algorithms, and the like. The data set can also include mobile and web applications.

In embodiments, the data set, e.g., software code, software applications, and/or software applications, can be received from open source tools. Moreover, it will be appreciated that methods and systems of the present disclosure can be utilized in an "open source" context. A defining characteristic of "open source" in the relevant art of the present disclosure is that any item that is "open source" is publicly accessible. Accordingly, as used herein, it will be appreciated that use of the term "open source" refers to items such as applications, data, programs, projects, software, software code, etc. that are capable of being modified as a result of said item being publicly accessible.

Generally, "open source" applications, data, systems, programs, projects, software, software code, etc. are those which welcome open and/or public exchange, participation, collaboration, transparency, and community development. One example of open source software is the LINUX® operating system kernel.

Alternatively, "closed source" applications, data, programs, projects, software, software code, etc. generally cannot be modified by any party, group, and/or individual(s) (e.g., the general public). Instead, exclusive control of closed source items is maintained by the individual(s), group, party, team, and/or organization who created said closed source item.

Closed source is also often used interchangeably with the term "proprietary" with regard to applications, systems, data, programs, projects, software, software code, etc. Closed source items are also often associated with licensing agreements and limited use restrictions.

One example of a closed source application is MIRCOSOFT® Office and MICROSOFT® Windows operating systems. In order to use MIRCOSOFT® Office and/or MICROSOFT® Windows operating systems, a user must agree beforehand (e.g., by signing a license such as a click-wrap license agreement) that the user will not do anything with the software that the software's authors have not expressly permitted.

As such, it will be appreciated that embodiments of the present disclosure can be configured to apply, operate, and function in open source environments, and closed source environments as well. In certain embodiments, methods and systems of the present disclosure can be configured to operate in both an open source and a closed source environment. Embodiments of the present disclosure are also capable of being configured to accept data (e.g., software, applications) that are open source; and data that are closed source by nature, as described above.

Referring back to FIG. 1, the method 100 can also include a step of analyzing the data set for duplicates 120. This step of analyzing the data set for duplicates 120 can also include evaluating the analysis of duplicates for the presence of false positives, false negatives, and/or tool errors or results from tool errors. Duplicates, false positives, false negatives, and tool errors are then removed from the data file 130, thereby creating an input file.

The input file can then be compared to at least one compliance standard(s) 140, such as a library of compliance standards, to identify a presence of any one of weaknesses defects, bugs, flaws, and vulnerabilities, and/or failures present in the input file.

In embodiments, the comparing of the input file to the compliance standards 140 can be performed in such a way that the input file can be compared to limited or select portions of the compliance standard(s). For example, in embodiments, the input file can be compared to portions of the compliance standard which are relevant to software assurance, risk assurance and/or compliance. In some embodiments, the input file can be compared only to relevant portions of the compliance standard(s) which pertain to software assurance.

Suitable compliance standards include, but are not limited to, National Institutes of Standards and Technology (NIST) standards, Payment Card Industry Data Security Standard (PCI DSS), Health Insurance Portability and Accountability Act (HIPAA), and International Organization for Standardization (ISO) standards.

As such, embodiments of the present disclosure can include a library of compliance standards including at least one, and up to all of the above-described compliance standards (e.g., NIST standards).

In addition, users of embodiments of the present disclosure can configure the methods and systems to include additional standards not listed above, including proprietary standards and/or case specific and project specific standards.

Moreover, although several of the above-listed compliance standards correspond to compliance in the United States or directed by United States agencies, embodiments of the present disclosure can also include compliance standards that correspond to different regions, countries, and/or organizations across the globe (e.g., international compliance standards).

The method 100 can also include a mapping and/or cross-mapping the input file that has been compared to standard(s) to Common Weakness Enumeration (CWE) Standards 150. Suitable CWE standards include, but are not limited to, MITRE® Common Weakness Enumeration Standards.

A risk prioritization or a risk prioritization ranking can then be created 160. Creating of the risk prioritization can include assigning a numeric value on a scale of 0 (zero) to 100 (one hundred) for each identified, compared and mapped weakness, vulnerability, and/or failure. With regard to the scale of 0 to 100, 0 (zero) represents zero impact of threat associated with the identified, compared, and mapped weakness, vulnerability, and/or failure, and 100 identifies the highest level of impact associated with the identified, compared and mapped weakness, vulnerability, and/or failure.

By impact, the term as used herein is meant to refer to any negative, detrimental and/or adverse impact. Therefore, items with a score close to 100 or 100 will have the greatest negative, detrimental and/or adverse impact to the data file and/or target system.

Although not illustrated, methods of the present disclosure can include allowing and/or prompting a user to sort the results of the risk prioritization or risk prioritization ranking based on any one, and up to all, of the following features, parameters and/or constraints: scheduling constraints, resource constraints, time constraints, budget constraints and logistical constraints. In embodiments, a user can also sort the results, or format the results to be delivered in developer view and/or artifact view. In embodiments, a user can also sort the results based on characteristics related to the user's software/application/system policies and related weaknesses, defects, bugs, flaws, vulnerabilities, capabilities, recovery and/or failure.

In addition, although not illustrated, methods of the present disclosure can also include allowing and/or prompting a user to input risk management settings and preferences prior to at least the step of comparing of the input file to compliance standards 140.

User provided risk management settings and preferences can include, but are not limited to, at least one of resource constraints, available time to repair, days to market, financial constraints, number of planned upgrades and/or future versions of said data set, shareholders, frequency of updating reports, frequency of comparing input files, frequency of mapping, frequency of creating risk prioritization rankings, desired compliance standards to be compared against, desired portions of compliance standards to be compared against, desired software assurance criteria, desired risk assurance criteria, desired compliance criteria, desired aspects of Common Weakness Enumeration standard(s) to be mapped to, desired portions of data file to be analyzed, and/or individual point(s) of contact(s). The individual point(s) of contact(s) can include names and contact information for responsible parties, decision makers and/or shareholders for managing, mitigating, and otherwise responding to the identified, compared, and mapped risk, vulnerability, weakness and/or threats.

User provided risk management settings and preferences can also include what aspects, headings and/or information to include in generating reports 170, as described further below.

User provided risk management settings and preferences can also include information, aspects, parameters, and characteristics relating to the development process of the data set, and information relating to configurations of the data set. In certain embodiments, users can enter information relating to risk tolerance as risk management settings and preferences.

The creating of the risk prioritization raking 160 can also include providing a numeric impact score that comprise at least one and up to all of the following factors: estimated cost of repair or fix, estimated time of repair or fix, number of users affected, amount and type of data affected, and amount and type of applications affected.

Methods of the present disclosure 100 can also include generating at least one report(s) 170, as referenced above. For instance, a primary report, a secondary report, a tertiary report . . . can be generated by methods of the present disclosure 100. It will be appreciated that the terms "primary," "secondary," and "tertiary," are merely provided as a naming convention, and are not intended to impart any other significance, features, or characteristics to said report(s). As such, one of ordinary skill in the art can select another naming convention for the reports (e.g., first, second, third; A, B, C, R1, R2, R3 . . . and the like).

At least one of the report(s) can include a report comprising the identified weakness, defect, threat, bug, vulnerability, and/or failures that were found during the comparing, mapping and creating of the risk prioritization steps (140, 150, 160, respectively), and a listing of the assigned numeric values or numeric impact scores.

In other embodiments, report(s) can include the identified weakness, defect, threat, bug, vulnerability, and/or failures that were found during the comparing, mapping and creating of the risk prioritization steps (140, 150, 160, respectively in FIG. 1), and recommendations for repairing said identified weakness, defect, threat, bug, vulnerability, and/or failures.

Report(s) can also include an indication of when said weaknesses, defects, bugs, flaws, vulnerabilities, and/or failures should be removed, fixed and/or addressed, whether in the context of a timeline, and/or in the context of during or prior to which version, revision, and/or update of the data file. As for determining when said weaknesses, defects, bugs, flaws, vulnerabilities, and/or failures should be removed, fixed and/or addressed, this can be made on the basis of the impact score, and/or user inputted settings and preferences, as described above.

Therefore for example, in a case where 25 (twenty five) weaknesses, defects, bugs, flaws, vulnerabilities, and/or failures have been reported and recommended for immediate action, this can be made on the basis of each of the 25 weaknesses etc. having a numerical score or impact score of greater than 70. The report can therefore recommend addressing, fixing, and/or removing said weaknesses etc. as soon as possible prior to the next version being released or updated. The report can also recommend addressing, fixing, and/or removing said weaknesses etc. within a specific time frame (e.g., 24 hours, 2 days, one week) based at least in part on user inputted settings and preferences.

Embodiments of the present disclosure can include generating reports which prioritize the weaknesses, defects, bugs, flaws, vulnerabilities and/or failures based on, for example, the impact score and/or user inputted preferences and settings. In cases where the data set comprises a software or application that has "x" number of planned iterations, versions, upgrades, updates, and the like, embodiments of the present disclosure can also include prioritizing the weaknesses, defects, bugs, flaws, vulnerabilities and/or failures and provide recommendations for when to address, fix, and/or remove said weaknesses, etc., per time frame based on the planned iterations, versions, upgrades, updates, and the like, impact scoring, and/or user preferences and settings.

Put differently, embodiments of the present disclosure can include recommendations for when to address, fix, and/or remove said weaknesses, etc., spread out across the "x" number of planned iterations, versions, upgrades, updates, and the like. The recommendations can be based on any one and up to all of the risk impact score and/or user preferences and settings.

Accordingly, embodiments of the present disclosure can be configured to provide a risk allocation throughout the lifecycle of the application, software, project, and the like. For example, in a case where 10 weaknesses, defects, bugs, flaws, vulnerabilities and/or failures have been identified for a software that has 4 planned versions, embodiments of the present disclosure can provide recommendations for when to address, fix, and/or remove said weaknesses etc. per a time frame based on the 4 planned versions, the impact scoring, and/or user preferences and settings, as follows.

For example, of the ten weaknesses, defects, bugs, flaws, vulnerabilities, and/or failures, three of them had an impact score of greater than 85. Therefore, the report can recommend fixing these three immediately, e.g., within 24 hours, or before the first planned upgrade, as these weaknesses, defects, bugs, flaws, vulnerabilities, and/or failures are capable of having the most detrimental impact on the project. Of the remaining seven weaknesses, etc., embodiments of the present disclosure can recommend addressing these weaknesses throughout the lifecycle of the project, based on impact scores, and/or user settings and preferences, to provide a risk allocation for the user. For example, embodiments of the present disclosure can recommend addressing some of the remaining seven weaknesses prior to the second planned version; some prior to the final planned version release, etc.

Moreover, as referenced in part above, embodiments of the present disclosure can be capable of updating the risk allocation based on changes in version and upgrade plans, changes in budget, changes in project scope, changes in data set, changes in user settings and preferences, changes in available resources, changes in project schedule, etc.

In certain embodiments, the above-described risk allocation can be made based purely on the impact score(s) and available time frame, including planned upgrades, versions, etc. As such, it will be appreciated that such risk allocations are absent, for example, vendor recommendations. In certain embodiments, the above-described risk allocation can also be made without input from user preferences and settings.

Although not illustrated, methods of the present disclosure can also include manually and/or automatically updating the compliance standards library and/or CWE standards, and manually and/or automatically modifying at least one report based on the updating, and manually and/or automatically modifying any aspect of the present disclosure. In cases where it is desired, methods of the present disclosure can also modify reports based on the aforementioned updating, whether manual, automatic, or both. Accordingly, new reports can be manually and/or automatically generated accordingly.

Methods of the present disclosure can be executed on at least one processor that performs a bridge between at least one operating system and one or more applications, including, but not limited to, a middleware type processor. Moreover, in certain embodiments, at least one or more of the applications can include a cloud platform. In certain embodiments, at least one or more of the applications and/or operating system can be an open source tool.

Figure 2:
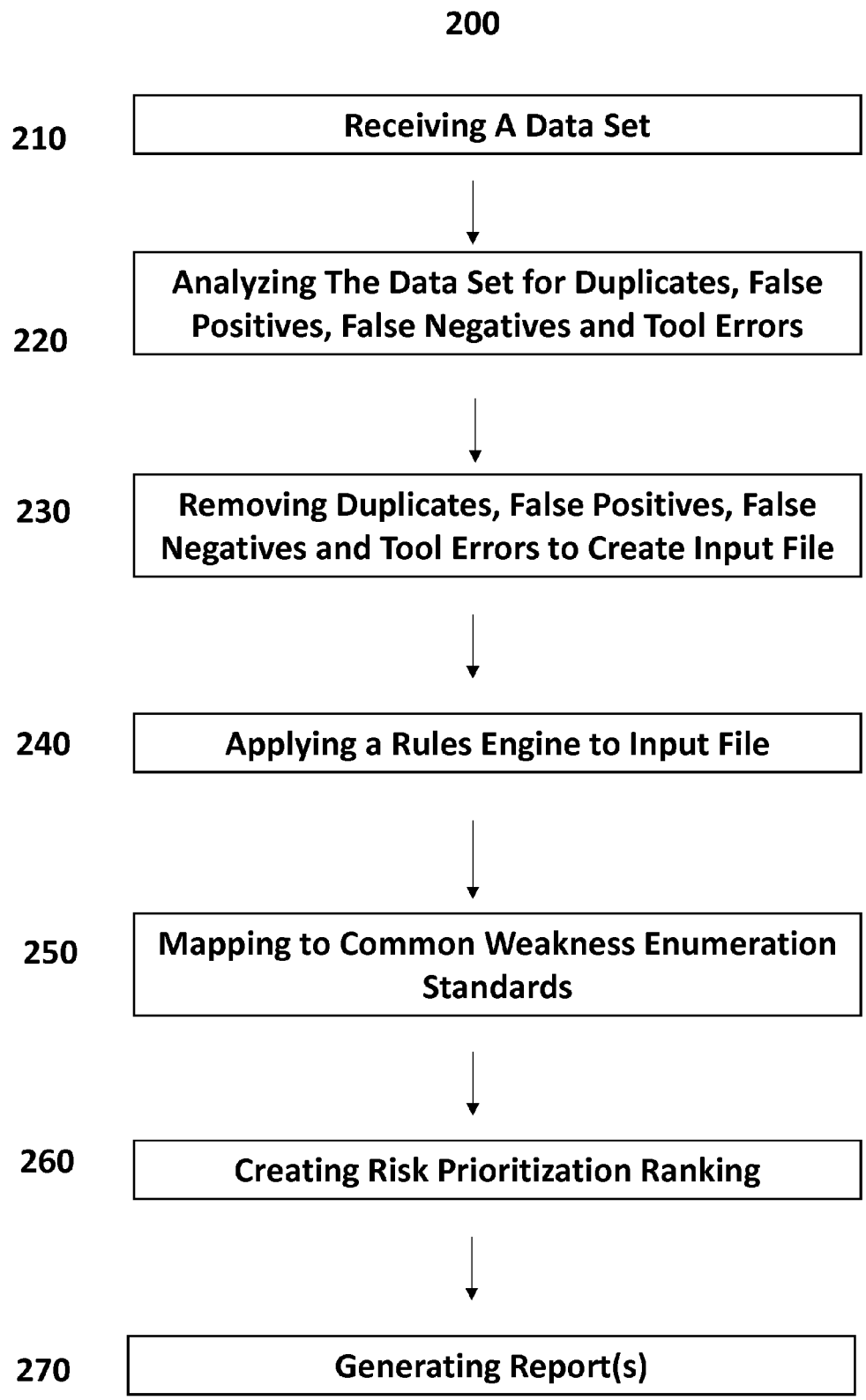
FIG. 2 illustrates a flow chart for managing and prioritizing risk according to another embodiment of the present invention.

With reference to FIG. 2, a flowchart depicting a method for managing and prioritizing risk 200 according another embodiment of the present disclosure to the present disclosure is illustrated therein.

The method 200 includes a step of receiving a data set 210; analyzing the data set for duplicates, including further evaluating for false negatives, false positives, and results of tool errors 220; and 230 removing duplicates, false positives, false negatives, and results of tool errors from the data set, thereby creating an input file 230.

Steps 210, 220, and 230 of FIG. 2 have features which correspond with, and/or are identical to, those described above with respect to steps 110, 120, and 130, in reference to FIG. 1. Therefore, in the interests of succinctness and improved clarity, the above description with respect to steps 110, 120, and 130 equally applies to steps 210, 220, and 230, will not be repeated herein, and is incorporated herein by reference in its entirety.

The method 200 can also include a step of applying a rules engine to the input file 240. The rules engine can comprise any one of a number of compliance standards, and rules or instructions in terms of how to analyze, compare, and/or correlate the input file with respect to any one and up to all of the compliance standards in the rules engine.

Suitable compliance standards include, but are not limited to, National Institutes of Standards and Technology (NIST) standards, Payment Card Industry Data Security Standard (PCI DSS), Health Insurance Portability and Accountability Act (HIPAA), and International Organization for Standardization (ISO) standards.

As such, embodiments of the present disclosure can include a library of compliance standards including at least one, and up to all of the above-described compliance standards (e.g., NIST standards). In addition, users of embodiments of the present disclosure can configure the methods and systems to include additional standards not listed above, including proprietary standards and/or case specific and project specific standards.

Moreover, although several of the above-listed compliance standards correspond to compliance in the United States, or directed by United States agencies, embodiments of the present disclosure can also include compliance standards that correspond to different regions, countries and/or organizations across the globe (e.g., international compliance standards).

The rules engine of the present disclosure can also include rules or instructions set by specific users. For instance, the rules engine can include instructions that only certain compliance standards, or aspects of compliance standards, should be utilized. The rules engine can also include instructions that only certain aspects of the data file be compared or analyzed with respect to certain compliance standards, and the like.

In certain embodiments, the rule engine can contain user provided risk management settings and preferences, as described above, which, for example, can include information, aspects, parameters, and characteristics relating to the development process of the data set, and information relating to configurations of the data set. In certain embodiments, users can enter information relating to risk tolerance as risk management settings and preferences. In the interests of succinctness and improved clarity, the above description with respect to inputting user provided risk management settings and preferences with regard to FIG. 1 equally apply to FIG. 2, will not be repeated herein, and is incorporated herein by reference in its entirety.

The method 200 can also include a step of mapping the input file to which the rules engine was applied to Common Weakness Enumeration standards 250. Step 250 of FIG. 2 have features which correspond with, and/or are identical to, those described above with respect to step 250, in reference to FIG. 1. Therefore, in the interests of succinctness and improved clarity, the above description with respect to step 150 equally apply to step 250, will not be repeated herein, and is incorporated herein by reference in its entirety.

The method 200 can also include a step of risk prioritization ranking 260; and a step of generating report(s) 270. Steps 260 and 270 of FIG. 2 have features which correspond with, and/or are identical to, those described above with respect to steps 160 and 170, in reference to FIG. 1. Therefore, in the interests of succinctness and improved clarity, the above description with respect to steps 160 and 170 equally applies to steps 260 and 270, will not be repeated herein, and is incorporated herein by reference in its entirety.

Embodiments of the present invention also include systems for mapping and prioritizing risk. Systems of the present disclosure include at least one processor, and at least a first, second, third, fourth, fifth, and sixth set of processor instructions stored on the at least one processor.

A first set of processor instructions can be to analyze a data set for a presence of duplicates, including evaluating the analysis results for false positives, false negatives, and tool errors. The data set can be received from any one of a static code analysis tool and/or a dynamic analysis tool.

In embodiments, the data set can include any one of software code and software applications. In certain embodiments, the data set can include lengthy, complex, robust, and significantly detailed software code and software code applications with high levels of complexity, functions, algorithms, and the like.

A second set of processor instructions can be to remove duplicates from the data set, thus creating an input file. In embodiments, the second set of processor instructions can also include evaluating the data file to further identify false positives, false negatives, and/or tool errors. Accordingly, the second set of processor instructions can further include removing said identified false positives, false negatives, and/or tool errors.

A third set of processor instructions can be to apply a rules engine. The rules engine can include instructions to compare the input file against at least one compliance standard in a library of compliance standards to identify a presence of weaknesses, defects, bugs, flaws, vulnerabilities, and/or failures in the input file. The library of compliance standards can include at least one or more compliance standards.

Suitable compliance standards include, but are not limited to, National Institutes of Standards and Technology (NIST) standards, Payment Card Industry Data Security Standard (PCI DSS), Health Insurance Portability and Accountability Act (HIPAA), and International Organization for Standardization (ISO) standards.

As such, embodiments of the present disclosure can include a library of compliance standards including at least one, and up to all of the above-described compliance standards (e.g., NIST standards). In addition, users of embodiments of the present disclosure can configure the methods and systems to include additional standards not listed above, including proprietary standards and/or case specific and project specific standards.

Moreover, although several of the above-listed compliance standards correspond to compliance in the United States or directed by United States agencies, embodiments of the present disclosure can also include compliance standards that correspond to different regions, countries and/or organizations across the globe (e.g., international compliance standards).

A fourth set of processor instructions can be to map the applied input file to Common Weakness Enumeration standards.

A fifth set of processor instructions can be to create a risk prioritization based on the compared results. In embodiments, the fifth set of processor instructions can be configured to create a risk prioritization ranking.

In certain embodiments, the fifth set of processor instructions can include assigning a numeric value on a scale of 0 (zero) to 100 (one hundred) for each identified, compared and mapped weakness, defect, bug, flaw, vulnerability, and/or failure. With regard to the scale of 0 to 100, 0 (zero) represents zero impact of threat associated with the identified, compared and mapped weakness, defect, bug, flaw, vulnerability, and/or failure, and 100 identifies the highest level of impact associated with the identified, compared and mapped weakness, vulnerability, defect, bug, flaw, and/or failure.

By impact, the term as used herein is meant to refer to any negative, detrimental and/or adverse impact. Therefore, items with a score close to 100 will have the greatest negative, detrimental and/or adverse impact to the data file and/or target system.

Systems of the present disclosure can also include a set of processor instructions prompting a user to input risk management settings and preferences prior to at least the third set of processor instructions.

User provided risk management settings and preferences can include, but are not limited to, at least one of resource constraints, available time to repair, days to market, financial constraints, number of planned upgrades and/or future versions of said data set, shareholders, frequency of updating reports, frequency of comparing input files, frequency of mapping, frequency of creating risk prioritization rankings, desired compliance standards to be compared against, desired portions of compliance standards to be compared against, desired software assurance criteria, desired risk assurance criteria, desired compliance criteria, desired aspects of Common Weakness Enumeration standard(s) to be mapped to, desired portions of data file to be analyzed, and/or individual point(s) of contact(s). The individual point(s) of contact(s) can include names and contact information for responsible parties, decision makers and/or shareholders for managing, mitigating, and otherwise responding to the identified, compared, and mapped risk, vulnerability, weakness and/or threats.

User provided risk management settings and preferences can also include what aspects, headings and/or information to include in the sixth set of processor instructions related to generating reports, as described further below.

As such, a sixth set of processor instructions can be to generate at least one report based on the risk prioritization and/or risk prioritization ranking.

For instance, a primary report, a secondary report, a tertiary report . . . can be generated by systems of the present disclosure. It will be appreciated that the terms "primary," "secondary," and "tertiary," are merely provided as a naming convention, and are not intended to impart any other significance, features, or characteristics to said report(s). As such, one of ordinary skill in the art can select another naming convention for the reports (e.g., first, second, third; A, B, C, R1, R2, R3 . . . and the like).

At least one of the report(s) can include a report comprising the identified weaknesses, vulnerabilities, defects, bugs, flaws, and/or failures that were found as a result of the comparing, mapping and creating of the risk prioritization processor instructions, and a listing of the assigned numeric values or numeric impact scores.

In other embodiments, report(s) can include the weaknesses, defects, bugs, flaws, vulnerabilities, and/or failures that were found during the comparing, mapping and creating of the risk prioritization processor instructions, and recommendations for repairing said identified weaknesses, defects, bugs, flaws, vulnerabilities, and/or failures.

Report(s) can also include an indication of when said identified weaknesses, defects, bugs, flaws, vulnerabilities, and/or failures should be removed, fixed and/or addressed, whether in the context of a timeline, and/or in the context of during or prior to which version, revision, and/or update of the data file. As for determining when said weaknesses, defects, bugs, flaws, vulnerabilities, and/or failures should be removed, fixed and/or addressed, this can be made on the basis of the impact score, and/or user inputted settings and preferences.

Therefore for example, in a case where 25 (twenty five) weaknesses, defects, bugs, flaws, vulnerabilities, and/or failures have been reported and recommended for immediate action, this can be made on the basis of each of the 25 weaknesses etc. having a numerical score or impact score of greater than 70. The report can therefore recommend addressing, fixing, and/or removing said weaknesses etc. as soon as possible prior to the next version being released or updated. The report can also recommend addressing, fixing, and/or removing said weaknesses etc. within a specific time frame (e.g., 24 hours, 2 days, one week) based on user inputted settings and preferences.

Figure 3:
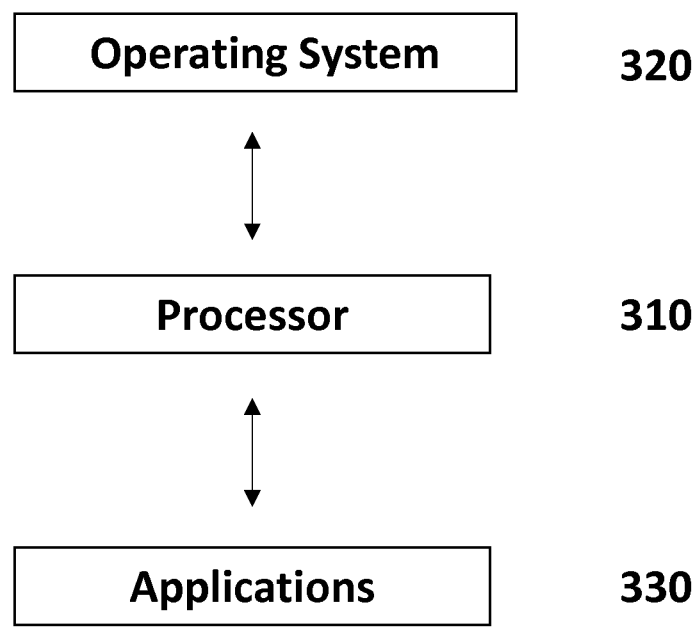
FIG. 3 illustrates a system according to one embodiment of the present invention.

Moreover, any one of the above-described reports with reference to FIGS. 1 and 2 apply to the reports associated with FIG. 3. Therefore, in the interests of succinctness and improved clarity, the above description with respect to reports as associated with FIGS. 1 and 2 equally apply to reports of FIG. 3, will not be repeated herein, and is incorporated herein by reference in its entirety.

Systems of the present disclosure can also include instructions for updating the rules engine, the library of compliance standards, and/or the Common Weakness Enumeration standards (or any other aspect of the instructions provided in the system). Systems of the present disclosure can also include instructions for modifying or updating any reports generated prior to the most recent system update. For example, should changes in any one of the compliance standards occur, systems can be configured to include instructions to update the library of compliance standards accordingly.

In addition, as referenced in part above, system embodiments of the present disclosure can also be configured to include instructions to update the risk allocation based on changes in version and upgrade plans, changes in budget, changes in project scope, changes in data set, changes in user settings and preferences, changes in available resources, changes in project schedule, etc. (basically, any changes affecting the data, software, applications etc. inputted into the system, and any changes affecting the user's project, goals, objectives, and the like).

With reference to FIG. 3, a system 300 according to one embodiment of the present disclosure is illustrated. The system 300 can include at least one processor 310, configured with a set of instructions, as described above. The system 300 can also be configured to perform as a bridge between at least one operating system 320 and one or more application 330. As such, it will be appreciated that the system 300 can be considered a middleware system to one of ordinary skill in the art.

In certain embodiments, at least one of the application(s) 330 can be a cloud. In certain embodiments, at least one of the operating system(s) 320 can be a user desktop or a computer system. Moreover, although FIG. 3 illustrates a single operating system and a single application, as referenced above, in embodiments of the present disclosure, the at least one processor 310 can be configured to perform as a bridge between one or more operating systems 320, and one or more applications 330.

System embodiments of the present disclosure can also be configured to operate and function in a closed source environment, an open source environment, or both, as described above. System embodiments of the present disclosure can also be configured such that the data set that is received, for example, in the first set of instructions, can be any one or both of a closed source or an open source application, software, software code, etc.

As such, the above description with regard to open source and closed source features of the present invention equally apply to both methods and systems of the present disclosure. Therefore, in the interests of succinctness and improved clarity, the above description with respect to open source and/or closed source features of the present invention as applied to methods of the present disclosure will not be repeated herein, and is incorporated herein by reference in its entirety.

As will be appreciated by one skilled in the art, aspects of the present invention may be embodied as a system, a method or a computer program product. Accordingly, aspects of the present invention may take the form of an entirely hardware embodiment, an entirely software embodiment (including firmware, resident software, micro-code, etc.) present on a computer storage medium or computer program product, or an embodiment combining software and hardware aspects that may all generally be referred to herein as a "circuit," "module" or "system."

In some embodiments, aspects of the present invention can be present in middleware, as described above. More specifically, by "middleware," it is intended to describe systems configured to operate as a bridge between at least one operating system and one or more applications; and processes executed on at least one processor that performs as a bridge between at least one operating system and one or more applications. Furthermore, aspects of the present invention may take the form of a computer program product embodied in at least one computer readable medium having computer readable program code embodied thereon.

Any combination of at least one computer readable medium may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, portable computer diskette, hard disk, random access memory (RAM), read-only memory (ROM), erasable programmable read-only memory (EPROM or Flash memory), optical fiber, portable compact disc read-only memory (CD-ROM), optical storage device, magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of at least one programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It will also be appreciated that various presently unforeseen or unanticipated alternatives, modifications, variations or improvements therein may be subsequently made by those skilled in the art, and are also intended to be encompassed by the following claims.

What is claimed is:

1. A software assurance method for managing and prioritizing risk, comprising:
   receiving a data set from one or more analysis tools, wherein the data set is selected from the group consisting of software code and software applications, wherein the applications comprise mobile and web applications;
   executing the data set by a middleware application to analyze the data set for a presence of duplicates, including evaluating the analysis results for false positives, false negatives, and tool errors;
   removing duplicates, false positives, false negatives and results of tool errors from the data set by the middleware application, thus creating an input file;
   prompting a user to input risk management settings and preferences;
   comparing the created input file against a library of compliance standards which pertain to software assurance to identify a presence of any one of weaknesses, defects, bugs, flaws, vulnerabilities, and/or failures in the input file;
   mapping the created input file to Common Weakness Enumeration standards;
   creating a risk prioritization ranking based on the mapped results wherein risk prioritization includes assigning a value to each identified, compared and mapped weakness, vulnerability and failure representing a level of impact associated with the identified, compared and mapped weakness, vulnerability and failure; and
   generating at least one report based on the risk prioritization.

2. The software assurance method of claim 1, wherein the one or more analysis tool includes at least one of a static code analysis tool and a dynamic analysis tool.

3. The software assurance method of claim 1, wherein the method is executed on the middleware application that performs as a bridge between at least one operating system and one or more applications.

4. The software assurance method of claim 3, wherein the one or more applications comprises a cloud platform.

5. The software assurance method of claim 1, wherein creating the risk prioritization ranking comprises assigning a numeric impact score to the mapped results from a scale of 0 to 100, where 0 represents zero risk, and 100 represents a highest form of risk.

6. The software assurance method of claim 5, wherein the numeric impact score factors in at least one member of the group consisting of estimated cost of repair, estimated time of repair, number of users affected, amount and type of data affected, and amount and type of applications affected.

7. The software assurance method of claim 1, wherein the at least one report comprises a primary report comprising identified weaknesses, defects, bugs, flaws, vulnerabilities, and/or failures, and a listing of the assigned impact scores.

8. The software assurance method of claim 1, wherein the at least one report comprises identified weaknesses, defects, bugs, flaws, vulnerabilities, and/or failures, and a listing of the assigned impact scores, and recommendations for repairing said identified weaknesses, defects, bugs, flaws, vulnerabilities, and/or failures.

9. The software assurance method of claim 1, further comprising a user inputting risk management settings and preferences, and wherein the at least one report comprises a report based in part on a number of user settings and preferences.

10. The software assurance method of claim 9, wherein the user risk management settings and preferences comprises at least one member of the group consisting of resource constraints, available time to repair, days to market, financial constraints, number of planned upgrades and/or future versions of said data set, desired compliance standards to be compared against, desired aspects of Common Weakness Enumeration standard(s) to be mapped to, desired portions of data file to be analyzed, and individual point(s) of contact(s).

11. The software assurance method of claim 10, wherein the at least one report comprises recommendations of when the identified weaknesses, defects, bugs, flaws, vulnerabilities, and/or failures should be repaired and/or removed.

12. The software assurance method of claim 1, wherein the compliance standards comprise at least one member selected form the group consisting of National Institutes of Standards and Technology (NIST) standards, Payment Card Industry Data Security Standard (PCI DSS), Health Insurance Portability and Accountability Act (HIPAA), and International Organization for Standardization (ISO) standards.

13. The software assurance method of claim 1, further comprising automatically updating the library and/or the Common Weakness Enumeration standards, and automatically modifying the at least one report based on the updating.

14. The software assurance method of claim 1, wherein the comparing of the input file against a library of compliance standards to identify a presence of any one of weaknesses, defects, bugs, flaws, vulnerabilities, and/or failures in the input file comprises comparing the input file to portions of the library of compliance standards relevant to the software assurance.

* * * * *